(12) United States Patent
Yip et al.

(10) Patent No.: US 11,113,870 B2
(45) Date of Patent: Sep. 7, 2021

(54) METHOD AND APPARATUS FOR ACCESSING AND TRANSFERRING POINT CLOUD CONTENT IN 360-DEGREE VIDEO ENVIRONMENT

(71) Applicant: Samsung Electronics Co., Ltd., Suwon-si (KR)

(72) Inventors: Eric Yip, Suwon-si (KR); Jaehyeon Bae, Suwon-si (KR); Hyunkoo Yang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/818,345

(22) Filed: Mar. 13, 2020

(65) Prior Publication Data

US 2020/0302680 A1 Sep. 24, 2020

Related U.S. Application Data

(60) Provisional application No. 62/819,929, filed on Mar. 18, 2019.

(30) Foreign Application Priority Data

Oct. 4, 2019 (KR) .................. 10-2019-0123018

(51) Int. Cl.
*G06T 15/20* (2011.01)
*H04L 29/06* (2006.01)
*G06T 3/00* (2006.01)

(52) U.S. Cl.
CPC .......... *G06T 15/205* (2013.01); *G06T 3/0087* (2013.01); *H04L 67/38* (2013.01); *G06T 2210/12* (2013.01); *G06T 2210/56* (2013.01)

(58) Field of Classification Search
CPC .............................. G06T 15/20; G06T 15/205
See application file for complete search history.

(56) References Cited

U.S. PATENT DOCUMENTS

| 7,301,557 B2 * | 11/2007 | Kakou ............. G08B 13/19602 |
| | | 348/36 |
| 9,214,042 B2 | 12/2015 | Cai et al. |
| 2015/0248538 A1 | 9/2015 | Van Lierde et al. |
| 2016/0155264 A1 | 6/2016 | Wei et al. |

(Continued)

FOREIGN PATENT DOCUMENTS

| KR | 10-2017-0095035 A | 8/2017 |
| WO | 2019/013384 A1 | 1/2019 |

OTHER PUBLICATIONS

International Search Report dated Jun. 22, 2020, issued in International Patent Application No. PCT/KR2020/003553.

*Primary Examiner* — Phi Hoang
(74) *Attorney, Agent, or Firm* — Jefferson IP Law, LLP

(57) ABSTRACT

A method and an apparatus for transmitting and receiving video content including 3D data are provided. According to an embodiment, a method for transmitting data related to content including an omnidirectional image and a point cloud object is provided. The method includes generating media data and metadata for the content including the omnidirectional image and the point cloud object; and transmitting the generated media data and the generated metadata, wherein the metadata comprises information for specifying sub-spaces of a bounding space related to the point cloud object.

20 Claims, 9 Drawing Sheets

(56) References Cited

U.S. PATENT DOCUMENTS

| | | | |
|---|---|---|---|
| 2017/0316600 A1* | 11/2017 | Jeong | G06T 3/0062 |
| 2018/0227558 A1* | 8/2018 | Oto | G06T 3/0043 |
| 2019/0052858 A1 | 2/2019 | Yip et al. | |
| 2020/0112710 A1* | 4/2020 | Oh | H04N 13/194 |
| 2020/0221063 A1* | 7/2020 | Kammachi Sreedhar | H04N 13/172 |
| 2020/0226792 A1* | 7/2020 | Wang | G06T 9/00 |
| 2021/0029294 A1* | 1/2021 | Deshpande | H04N 5/23238 |

* cited by examiner

6DoF bounding sphere with M layers of sub-sphere blocks, layers defined by subdivisions_layer Sub-sphere block in layer M

METHOD AND APPARATUS FOR ACCESSING AND TRANSFERRING POINT CLOUD CONTENT IN 360-DEGREE VIDEO ENVIRONMENT

CROSS-REFERENCE TO RELATED APPLICATION(S)

This application is based on and claims priority under 35 U.S.C. § 119(e) of a U.S. Provisional application Ser. No. 62/819,929, filed on Mar. 18, 2019, in the U.S. Patent and Trademark Office, and under 35 U.S.C. § 119(a) of a Korean patent application number 10-2019-0123018, filed on Oct. 4, 2019, in the Korean Intellectual Property Office, the disclosure of each of which is incorporated by reference herein in its entirety.

BACKGROUND

1. Field

The disclosure relates to methods and apparatuses for transmitting and receiving point cloud data and omni-directional video data.

2. Description of Related Art

Virtual reality refers to an interface between a user and a device, which creates a certain environment or context on a computer and allows the user to feel as if he or she interacts with a real-world environment or context. Virtual reality technology may deliver immersion to users via manipulated sensory stimuli and have various applications in many different industry sectors including gaming, education, medicine, journalism, etc.

A recent elevated interest in virtual reality has led to vigorous development efforts to implement a diversity of virtual reality techniques. Intensive research is being conducted on, among others, technology for processing images constituting a virtual space necessary for implementing virtual reality. For example, with the development of virtual reality image-related technology, users may view 360-degree images rather than two-dimensional (2D) images.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a point cloud refers to a method for representing three-dimensional (3D) content. Partial transmission may be performed to increase the overall compression efficiency or raise the resolution of the area which corresponds to the user's viewing space as compared with the other areas. To reduce data transmissions related to a 3D image, a server may transmit a separate 360-degree video for the background, as well as perform the partial transmission of a point cloud. To prevent a hole from occurring in the 3D content and the background image provided to the user, information for minimum data required for rendering needs to be provided to the user. A terminal needs to provide information for the viewing space to the server.

Additional aspects will be set forth in part in the description which follows and, in part, will be apparent from the description, or may be learned by practice of the presented embodiments.

In accordance with an aspect of the disclosure, a method for transmitting data related to content including an omnidirectional image and a point cloud object is provided. The method includes generating media data and metadata for the content including the omnidirectional image and the point cloud object; and transmitting the generated media data and the generated metadata, wherein the metadata comprises information for specifying sub-spaces of a bounding space related to the point cloud object.

In accordance with another aspect of the disclosure, a method for receiving data related to content including an omnidirectional image and a point cloud object is provided. The method includes receiving media data and metadata for the content including the omnidirectional image and the point cloud object; and rendering the content based on the received media data and the metadata, wherein the metadata comprises information for specifying sub-spaces of a bounding space related to the point cloud object.

In accordance with another aspect of the disclosure, an apparatus for transmitting data related to content including an omnidirectional image and a point cloud object is provided. The apparatus includes a controller configured to generate media data and metadata for the content including the omnidirectional image and the point cloud object; and a communication interface configured to transmit the generated media data and the generated metadata, wherein the metadata comprises information for specifying sub-spaces of a bounding space related to the point cloud object.

In accordance with another aspect of the disclosure, an apparatus for receiving data related to content including an omnidirectional image and a point cloud object is provided. The apparatus includes a communication interface configured to receive media data and metadata for the content including the omnidirectional image and the point cloud object; and a controller configured to render the content based on the received media data and the metadata, wherein the metadata comprises information for specifying sub-spaces of a bounding space related to the point cloud object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
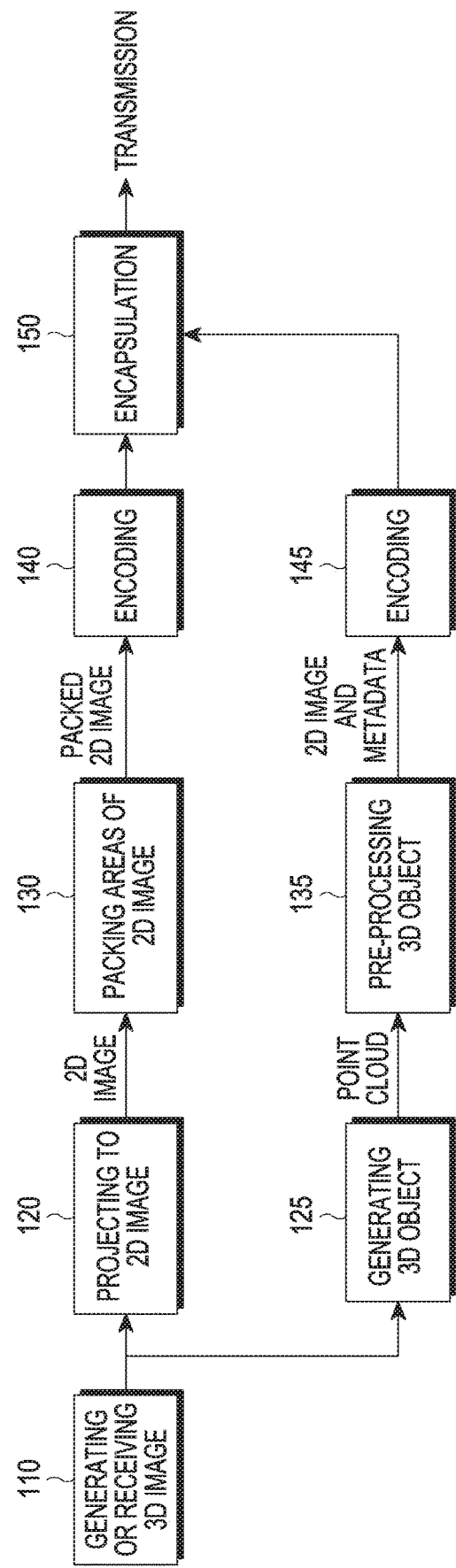
FIG. 1 is a view illustrating a typical data processing procedure of a transmitter for transmitting data regarding a 3D image according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Some embodiments of the disclosure may be shown in functional block components and various processing operations. All or some of the functional blocks may be implemented in various numbers of hardware and/or software components executing specific functions. For example, the functional blocks of the disclosure may be implemented by one or more micro-processors or by circuit components for predetermined functions. For example, the functional blocks of the disclosure may be implemented in various programming or scripting languages. The functional blocks may be implemented in an algorithm executed on one or more processors. The disclosure may adopt the related art for, e.g., electronic environment settings, signal processing, and/or data processing.

Lines or members connecting the components shown in the drawings represent functional connections and/or physical or circuit connections merely as examples. In actual devices, the inter-component connections may be represented with various functional connections, physical connections, or circuit connections which are replaceable or added.

As used herein, the term "image" may collectively refer to a still image, video, video frame, and/or video stream and may encompass 2D frames, 3D frames, and frames in which 2D and 3D frames are mixed. For example, the term "image" may collectively refer to a 3D frame represented as a point cloud, a 360-degree omnidirectional media frame, and/or a frame including 360-degree omnidirectional media and a 3D object represented as a point cloud.

As used herein, the term "image" does not only refer to an image in its original meaning but is also used as a comprehensive term to describe various formats or forms of video image information that may be known in the related art, including "picture," "frame," "field," or "slice." For example, "image" may mean one of a plurality of pictures or a plurality of frames constituting video content or mean a whole video content including a plurality of pictures or a plurality of frames.

For ease of description, 3D objects as used herein are represented in a point cloud form and, for transmission purposes, are assumed to be compressed in such a technique as International Organization for Standardization (ISO)/International Electrotechnical Commission (IEC) 23090-5 Video based Point Cloud Compression. However, embodiments of the disclosure are not limited to the above format and compression technique but may rather be applied to other common techniques for representing and transmitting 3D objects, e.g., Mesh. "3D object" may also refer to a single independent object or a set of objects. As an example, when a desk with a laptop computer placed thereon is represented as a 3D object, two 3D objects may be created, with the laptop computer and the desk regarded as separate objects, or one 3D object including both the laptop computer and the desk may be created.

Hereinafter, embodiments of the disclosure are described in detail with reference to the accompanying drawings.

FIG. 1 is a view illustrating a typical data processing procedure of a transmitter for transmitting data regarding a 3D image according to an embodiment of the disclosure. For example, according to an embodiment, a transmitter may be a server for providing data or a service related to a 3D image. The 3D image may refer to both a dynamic image and a static image. The 3D image-related data may include immersive media data including 360-degree omni-directional virtual reality content or 6 degree of freedom-related content and 3D objects, e.g., point cloud.

Referring to FIG. 1, in operation 110, the transmitter may obtain a 3D image. As an example, the transmitter may generate a 3D image by stitching images captured by multiple cameras in various directions. As another example, the transmitter may externally receive data regarding a 3D image already produced. For example, the 3D image may be rendered in one shape among a sphere, a cube, a cylinder, or an octahedron. However, the disclosure is not limited to the example 3D image shapes but rather various shapes of 3D images may be generated or received.

In operation 120, the transmitter may generate a 2D image by projecting the 3D image on the space to a 2D plane.

According to an embodiment, the transmitter may project an omni-directional image on a 3D space to a rectangular picture in a predetermined format.

Any one of equirectangular projection (ERP), octahedron projection (OHP), cylinder projection, cube projection, and various projection schemes available in the relevant art may be used to project the 3D image to the 2D image.

In operation 130, the transmitter may pack the projected 2D image. Packing may mean producing a new 2D image (i.e., packed 2D image) by relocating, resizing, or redirecting at least some of the plurality of regions constituting the projected 2D image. Here, for packing purposes, resizing, transforming, rotating, and/or re-sampling (e.g., upsampling, downsampling, and differential sampling depending on positions in the region) of the region may be performed. The transmitter may generate a packed picture by processing the configuration of a picture to be usable in user gaze-based processing by raising the overall compression efficiency or increasing the resolution of the region corresponding to a specific viewport as compared with the other regions.

Figure 2:
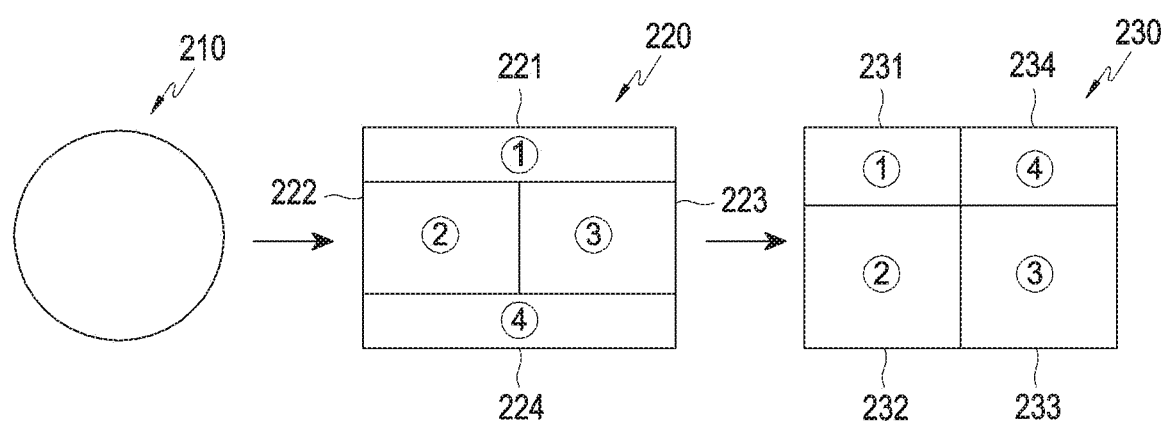
FIG. 2 is a view illustrating a method of projecting a 3D image to a 2D image and packing the projected 2D image according to an embodiment of the disclosure.

FIG. 2 is a view illustrating a method of projecting a 3D image to a 2D image and packing the projected 2D image according to an embodiment of the disclosure.

Referring to FIG. 2, a 3D image 210 may have a spherical shape, as an example. According to an embodiment, the transmitter may generate a projected 2D image 220 by projecting the 3D image 210 in an ERP scheme. The transmitter may split the projected 2D image 220 into a plurality of regions 221, 222, 223, and 224. Although FIG. 2 illustrates that the projected 2D image 220 is split into four regions, the disclosure is not limited to the example shown in FIG. 2. The projected 2D image 220 may be split into various numbers of regions or in various shapes. There may be various methods of splitting the projected 2D image 220 according to embodiments.

According to an embodiment, the transmitter may generate the packed 2D image 230 from the projected 2D image 220. The transmitter may generate the packed 2D image 230 by modifying or rearranging the plurality of regions 221, 222, 223, and 224 of the projected 2D image 220. A plurality of regions 231, 232, 233, and 234 of the packed 2D image 230, respectively, may sequentially correspond to the plurality of regions 221, 222, 223, and 224 of the projected 2D image 220. The disclosure is not limited to the example shown in FIG. 2. For example, various modifications and rearrangements may be made according to embodiments.

Turning back to FIG. 1, in operation 140, the transmitter may encode the packed picture. For encoding, various video codecs, such as high efficiency video coding (HEVC) or advanced video coding (AVC), may be used.

According to an embodiment, the transmitter may split the packed picture into a plurality of regions. The transmitter may individually perform encoding on the plurality of regions of the projected 2D image. The transmitter may perform encoding only on one or more regions of the plurality of regions of the packed picture. As an example, encoding may be performed on a group image for two or more among the plurality of regions of the packed picture. As another example, encoding may be carried out on the whole packed picture.

In operation 150, the transmitter may encapsulate the encoded data. The transmitter may process the encoded data to follow a predetermined transmission protocol by, e.g., splitting the encoded data and processing, e.g., adding heads to the split data. The transmitter may transmit the encapsulated data. The transmitter may transmit data (e.g., metadata) necessary for reproducing data and/or additional data related to the data individually or together with the encapsulated data.

The transmitter may transmit the bit stream generated by encapsulation according to a moving picture experts group (MPEG) media transport (MMT) scheme. According to an embodiment, the transmitter may generate a plurality of tracks corresponding to the 3D image and transmit data for all or some of the plurality of tracks to a receiver. The plurality of tracks may have data for different regions or may have different quality levels.

According to an embodiment, the transmitter may extract a specific object on the space, as a separate object, and process the specific object and may transmit the object along with an image on the space. As an example, in a soccer match broadcast, the stadium and spectators are transmitted as a 2D (or low-resolution 3D) image, and each player is extracted as a 3D object, processed, e.g., compressed, and then transmitted.

In operation 125, the transmitter may extract a specific object on the space as a 3D object in the point cloud format. The extracted 3D object has a point cloud format, for example.

The transmitter performs pre-processing for encoding the 3D object in operation 135. In operation 145, the transmitter encodes the pre-processed 3D object, performs the encapsulation (operation 150) on the encoded 3D object, and transmits the resultant object. The result of the 3D object pre-processing may be a plurality of 2D images and metadata, meaning that various video codec schemes, such as HEVC or AVC, but rather than a 3D-dedicated encoder, may be used in operation 145. According to an embodiment, the 3D object pre-processing 135 is described below in greater detail.

Although FIG. 1 illustrates that one transmitter encapsulates a 3D image and 3D object together and transmits them, an additional transmitter may be used which separately encapsulates the 3D object according to service types.

Figure 3:
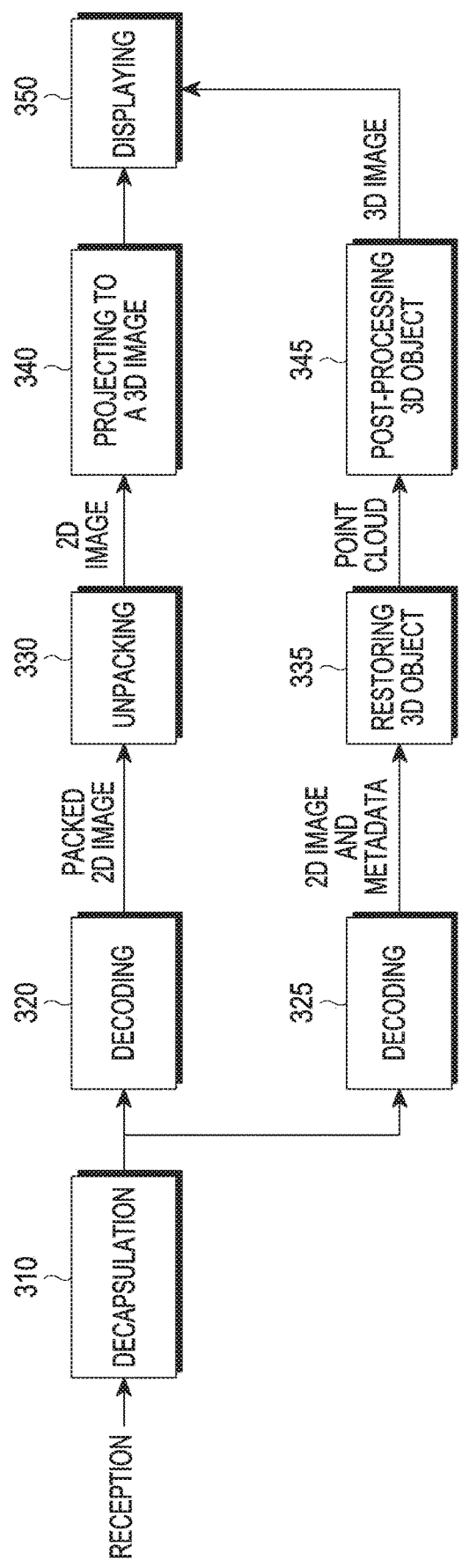
FIG. 3 is a view illustrating a typical data processing procedure of a receiver for receiving data regarding a 3D image according to an embodiment of the disclosure.

FIG. 3 is a view illustrating a typical data processing procedure of a receiver for receiving data regarding a 3D image according to an embodiment of the disclosure.

Referring to FIG. 3, according to an embodiment, a receiver may be an augmented reality (AR) device capable of providing augmented reality content to the user or a virtual reality (VR) device capable of providing virtual reality content to the user. The receiver may otherwise denote any kind of device capable of receiving and playing 3D image-related data.

According to an embodiment, the receiver may receive data regarding the 3D image transmitted from the transmitter. In operation 310 of FIG. 3, the receiver may perform decapsulation on the received data. By decapsulation of operation 310, the encoded data generated via encoding of operations 140 and 145 of FIG. 1 may be obtained.

In operation 320, the receiver may perform decoding on the decapsulated data. By decoding of operation 320, the packed 2D image may be restored.

In operation 325, the receiver may restore the 2D image and metadata by performing decoding on the decapsulated data and may restore the 3D object using the 2D image and the metadata in operation 335.

The receiver may perform image rendering on the decoded data, thereby displaying the 3D image. Specifically, in operation 330, the receiver may perform unpacking on the decoded data (i.e., the packed 2D image). By unpacking of operation 330, the 2D image generated by projection of operation 120 of FIG. 1 may be restored.

To perform unpacking, the receiver may perform inverse conversion of the modification and/or rearrangement performed on the plurality of regions of the projected 2D image in operation 130 of FIG. 1. To that end, the receiver may be aware of the data packing scheme performed by the transmitter. For example, the packing scheme may be known in advance to the transmitter and the receiver. As an example, the transmitter may transfer information for the packing scheme to the receiver via a separate message, e.g., metadata. As another example, information regarding the packing scheme may be included in the header of the transmission data generated by encapsulation and be transferred to the receiver.

In operation 340, the receiver may project the unpacked 2D image to a 3D image. According to an embodiment, to project the 2D image to the 3D image, the receiver may use inverse projection of the projection which has been used in operation 120 of FIG. 1, but embodiments of the disclosure are not limited thereto. By projecting the unpacked 2D image to the 3D image, the receiver may generate a 3D image.

In operation 345, the receiver may perform post-processing on the 3D object restored in operation 335. The post-processing may include a task for enhancing image quality and processing, e.g., rotation or enlarging, for coordinate matching with the image of operation 340.

In operation 350, the receiver may display at least part of the 3D image generated in operation 340 through a display device. For example, the receiver may extract only data corresponding to the current field-of-view (FOV) of the 3D image and render the data.

Although FIG. 3 illustrates that the receiver receives the 3D image and the 3D object together and decapsulates them, the receiver may separately receive the 3D object in a stream and decapsulate it according to service types.

According to an embodiment, the transmitter may encapsulate all of the 3D image and 3D object constituting the content and transfer to the receiver, or the transmitter may encapsulate only part of the data representing the 3D image and the 3D object and transfer to the receiver. In this case, the part of data to be transmitted may be selected based on feedback information for the region in the 3D space that is to be displayed on the display of the receiver.

According to an embodiment, the transmitter may split the 3D object into frustum units, process and transmit them so that the 3D object may be independently processed in the space represented as a sphere.

Video-based point cloud compression (V-PCC) technology assumes a virtual space surrounding a 3D object to be encoded and performs pre-processing for encoding. According to an embodiment, the transmitter may assume a sphere surrounding the 3D object and perform the pre-processing. To separately process only part of the 3D object, the sphere may be split into a plurality of regions, and the correlation between each region and the encoded data needs to be indicated.

Figure 4:
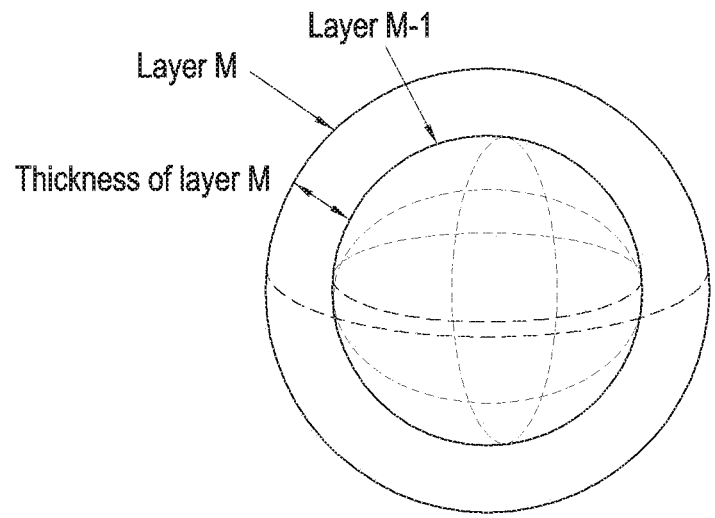
FIG. 4 is a view illustrating an example method of splitting a sphere surrounding a 3D object and representing the same according to an embodiment of the disclosure.
Figure 4:
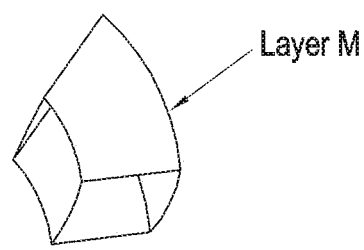

FIG. 4 is a view illustrating an example method of splitting a sphere surrounding a 3D object and representing the same according to an embodiment of the disclosure. The sphere surrounding the 3D object is defined with the radius of the sphere (bounding_sphere_radius).

Referring to FIG. 4, the sphere surrounding the 3D object may be split into horizontal and vertical circular arcs represented with subdivision_column, subdivision_row and layers represented with subdivisions_layer. A sub-sphere block is shown in the shape of a segment of, e.g., a tire, as shown in FIG. 4, and its size may vary.

The sub-sphere block may be identified with indexes of its associated column, row, and layer. For partial processing on the 3D object, the data corresponding to the sub-sphere block needs to be able to be identified from the encoded data. A method for identifying data necessary per sub-sphere block is described taking the V-PCC technology as an example.

Since the V-PCC technology uses a 2D video codec, such as HEVC or AVC, as its default compression tool, the data representing the part of the 3D object may be identified by identifying which 2D region in one or more 2D video frames input to the 2D video codec the part of the 3D object corresponds to. In this case, each 2D video frame input to the 2D video codec may include one or more of the following pieces of data: geometry; texture; occupancy, and patch data. Further, regions in the 2D video frame may be specified by one of the following methods.

1. Any rectangular region defined on a per-pixel basis
2. regions defined in the legacy 2D video codec: HEVC motion constrained tile sets; slice segment addresses in AVC; coding tree units in HEVC; etc.

The legacy V-PCC technology assumes a virtual cuboid surrounding the 3D object to be encoded and performs pre-processing for encoding. In a system using both the cuboid-format bounding box and the bounding sphere proposed herein, the 3D partial block may be signaled using a structure as shown in Table 1 below.

TABLE 1

```
aligned (8) class PCCBlockStruct ( ) {
    unsigned int (4) block_type;
    unsigned int (1) uniform_spacing_flag;
    bit (3) reserved = 0;
    if (block_type == 0) {
        unsigned int (32) bounding_box_x_width;
        unsigned int (32) bounding_box_y_height;
        unsigned int (32) bounding_box_z_depth;
        unsigned int (32) subdivisions_x;
        unsigned int (32) subdivisions_y;
        unsigned int (32) subdivisions_z;
        if (!uniform_spacing_flag) {
            for (i = 0; i < subdivisions_x; i++) {
                unsigned int (32) subdivision_width[i];
            }
            for (j = 0; j < subdivisions_y; j++) {
                unsigned int (32)
    subdivision_height[j];
            }
            for (k = 0; k < subdivisions_z; k++) {
                unsigned int (32) subdivision_depth[k];
            }
        }
    }
    if (block_type == 1) {
        unsigned int (32) bounding_sphere_radius;
        unsigned int (32) subdivision_columns;
        unsigned int (32) subdivision_rows;
        unsigned int (32) subdivision_layers;
        if (!uniform_spacing_flag) {
            for (i = 0; i < subdivision_columns; i++) {
                unsigned int (32)
    column_width_angle[i];
            }
            for (j = 0; j < subdivision_rows; j++) {
                unsigned int (32) row_length_angle[j];
            }
            for (k = 0; k < subdivision_layers; k++) {
                unsigned int (32) depth_thickness[k];
            }
        }
    }
}
```

Further, the relationship with the region in the 2D video frame corresponding to each partial block may be signaled using a structure as shown in Table 2 below.

TABLE 2

```
aligned(8) class VPCCBlockDeclarationStruct ( ) {
    for (i = 0; i < subdivision_x; i++) {
    for (j = 0; j < subdivision_y; j++) {
    for (k = 0; k < subdivision_z; k++) {
        unsigned int (8) num_regions;
        for (m = 0; m < num_reg; m++) {
            bit (4) reserved = 0;
            unsigned int (4) declaration_type[m];
            if (declaration_type[m] == 0) {
                unsigned int (32) reg_width[m];
                unsigned int (32) reg_height[m];
                unsigned int (16) reg_top[m];
                unsigned int (16) reg_left[m];
            if (declaration_type[m] == 1) {
                unsigned int (16) mcts_id[m];
            if (declaration_type[m] == 2) {
                unsigned int (16)
        slice_segment_address[m];
            if (declaration_type[m] == 3) {
                unsigned int (16) CTU_count[m];
        }
      }
     }
    }
}
```

For example, the usage of each field in Tables 1 and 2 above is as follows:

block_type equal to 0 represents a cuboid bounding box with a subdivision of the bounding box into cartesian cuboid blocks, equal to 1 represents a spherical bounding sphere with a subdivision of the bounding sphere into spherical sub-sphere blocks. (0 when a cuboidal partial block is used and 1 when a sub-sphere block of a sphere is used);

uniform_spacing_flag specifies, when equal to 1, that the subdivision of cuboid blocks or sub-sphere blocks are uniform between the number of subdivisions specified. When equal to 0, cuboid block or sub-sphere block sizes are specified implicitly. (1 in the case of equal-splitting, and 0 in the case of unequal-splitting, where unequal-splitting is used, the size of each partial block/sub-sphere block is specified);

bounding_box_x_width, bounding_box_y_height, and bounding_box_z_depth specify the dimensions of the bounding box used for the representation of the point cloud data. Units are defined as points equivalent to the number of geometry 3D points representable by the number of bits used for encoding V-PCC data (the size of the cuboidal bounding box. Specified in the same unit as the point of content used in V-PCC compression);

subdivisions_x, subdivisions_y, and subdivisions_z are integers specifying the number of subdivision blocks each of the axes is divided into (the number of segments, along each axis, of the cuboidal bounding box);

subdivision_width, subdivision_height, and subdivision_depth specify respectively the length of the width, height and depth of the specific PCC block, in the same units as the bounding box (the interval between splitting lines when the cuboidal bounding box is split along each axis);

bounding_sphere_radius specifies the radius of the bound sphere containing the point cloud data (the size of the spherical bounding sphere. Specified in the same unit as the point of content used in V-PCC compression);

subdivision_columns specifies the number of subdivision volumetric sub-sphere columns which the sphere is divided into (the number of segments, in the vertical direction, of the sphere);

subdivision_rows specifies the number of subdivision volumetric sub-sphere rows which the sphere is divided into (the number of segments, in the horizontal direction, of the sphere);

subdivision_layers specifies the number of subdivision sub-sphere layers which the sphere is divided into (the number of layers the sphere is split into);

column_width_angle specifies the subtending angle, in radians, which defines the maximum width of the corresponding sub-sphere block (a circular arc) (the angle, from the origin, of the circular arc obtained when the sphere is split in the vertical direction (subtending angle));

row_length_angle specifies the subtending angle, in radians, which defines the maximum height of the corresponding sub-sphere block (a circular arc); (the angle, from the origin, of the circular arc obtained when the sphere is split in the horizontal direction (subtending angle));

depth_thickness specifies the thickness of the corresponding sub-sphere block (the thickness of the corresponding sub-sphere block);

num_regions specify the number of 2D frame regions containing V-PCC patch data corresponding to a specific PCC block volume. (the number of 2D frame regions corresponding to the corresponding 3D partial block/sub-sphere block in the V-PCC patch data);

declaration_type defines the granularity of the declaration for the 2D frame region, (unit for defining the 2D frame region, refer to Table 3);

TABLE 3

| Value | Declaration Type |
|---|---|
| 0x00 | Rectangular pixel region |
| 0x01 | Motion constrained tile set |
| 0x02 | Slice segment |
| 0x03 | Coding tree unit |
| 0x04~ | Reserved | reg_width and reg_height specify the width and height, respectively, of a rectangular pixel region in the 2D frame (the numbers of horizontal and vertical pixels in the rectangular 2D frame region);

reg_top specifies the pixel distance from the top of the 2D frame to the top edge of the rectangular pixel region (the number of pixels from the top of the 2D frame to the top of the rectangular 2D frame region);

reg_left specifies the pixel distance from the left of the 2D frame to the left edge of the rectangular pixel region (the number of pixels from the left side of the 2D frame to the left side of the rectangular 2D frame region).

According to an embodiment, a service of providing content constituted of an omni-directional video image and a 3D object provides, via a communication network, only data necessary for reproducing part of the content including the part played on the user display, rather than the whole data necessary for reproducing the content, thereby delivering high-quality services beyond the limits in the transmission capacity of the communication network and the user terminal media processing capability. Described below is a method for providing only part of content and reproducing the same on a receiver based on a service of providing a 360-degree video generated by an ISO/IEC 23090-2 Omni-directional media format (OMAF) technique and a 3D object processed with V-PCC technology.

Figure 5:
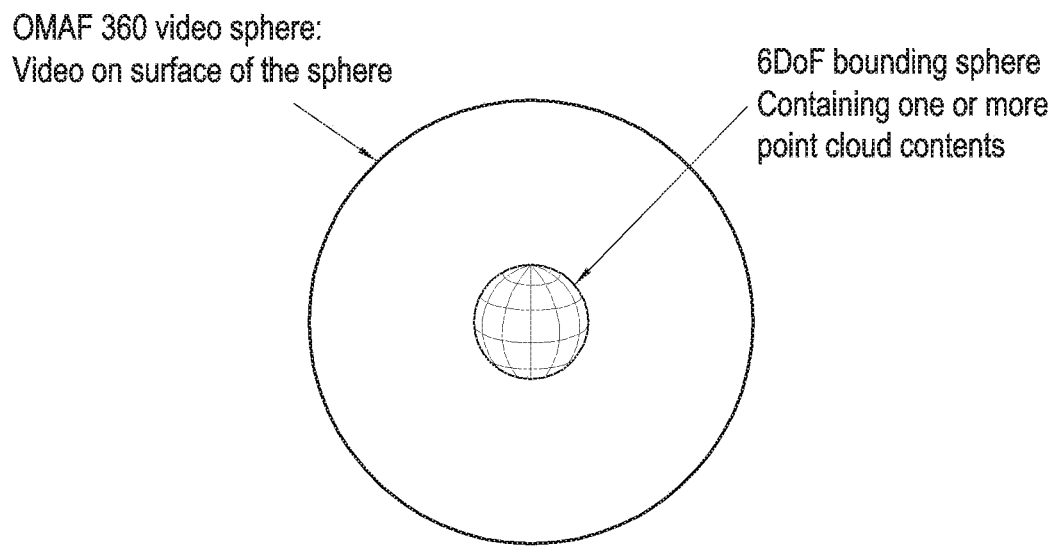
FIG. 5 is a view illustrating the relationship between a 360-degree image spherical body of omnidirectional media format (OMAF) and a six degrees of freedom (6DoF) spherical body according to an embodiment of the disclosure.

FIG. 5 illustrates the relationship between an OMAF 360-degree video sphere and a 6DoF bounding sphere described below according to an embodiment of the disclosure.

As an example, the OMAF image may represent the background of the content. The user may play the content while changing the origin and direction of his or her gaze in the 6DoF sphere omnidirectionally and freely. In this case, the 6DoF sphere may be split into a plurality of sub-sphere blocks as is a sphere surrounding a 3D object, and each sub-sphere block may include part of one 3D object or the respective parts of a plurality of 3D objects. The sub-sphere blocks necessary for playing content may be identified depending on the origin and direction of the user's gaze, and only data necessary for playing content may be extracted and transmitted using additional information as shown in Tables 1 and 2.

Figure 6:
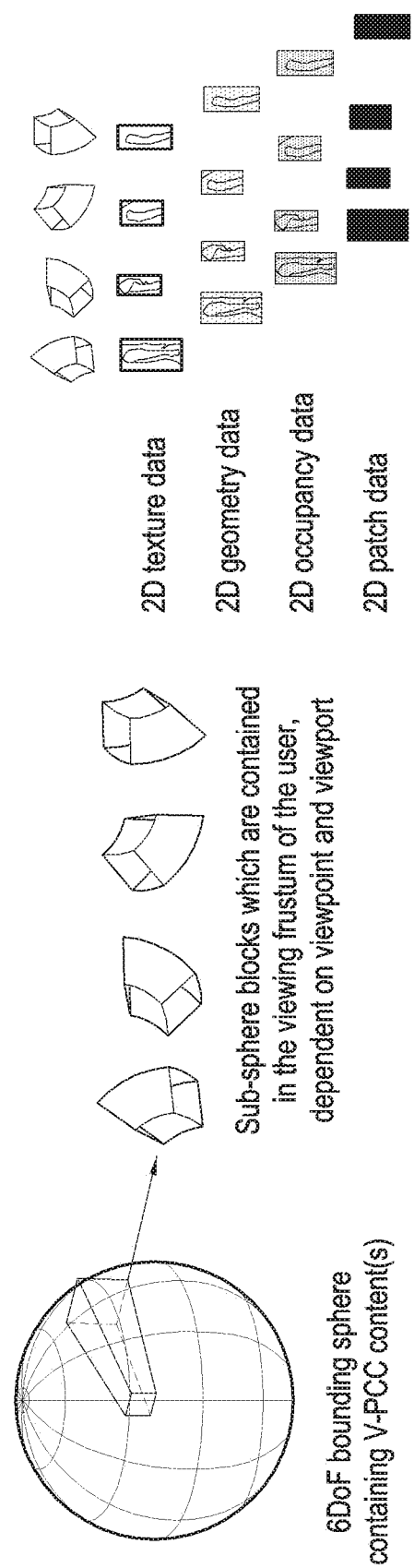
FIG. 6 is a view illustrating the relationship between a 6DoF spherical body and video-based point cloud compression (V-PCC) data included therein according to an embodiment of the disclosure.

FIG. 6 is a view conceptually illustrating the relationship between the 6DoF sphere and V-PCC data included in the 6DoF sphere according to an embodiment of the disclosure.

Figure 7:
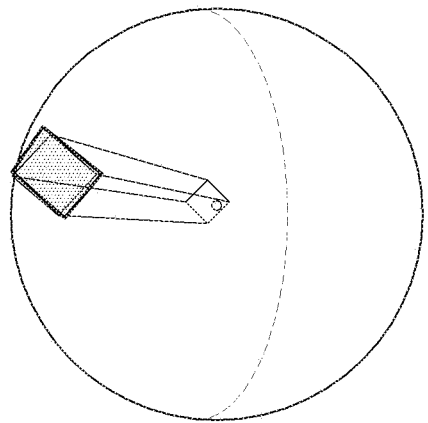
FIG. 7 is a view illustrating a method of extracting part of an OMAF image to be used as a background of a 6DoF spherical body according to an embodiment of the disclosure.
Figure 7:
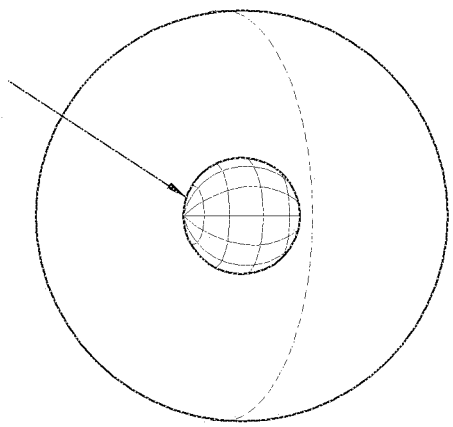
Figure 7:
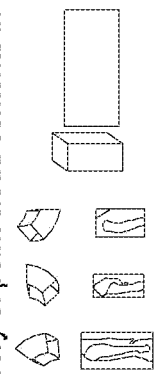

FIG. 7 is a view illustrating a method of extracting part of an OMAF image to be used as a background of a 6DoF spherical body according to an embodiment of the disclosure.

Referring to FIG. 7, when the origin and direction of the user's gaze of the 6DoF sphere are determined, the viewing space of the 6DoF sphere may be represented in the form of a frustum. In this case, a part of the OMAF image, which is to be reproduced along with the viewing space, may be discovered by translating the frustum to the origin of the 360-degree image sphere and projecting the frustum to the inside surface of the 360-degree image sphere. After the region of the 360-degree image which is to be reproduced along with the frustum is identified, a method of extracting and transmitting data indicating the identified region may use a technique, such as Sub-picture tile defined in the OMAF standards.

The above-described viewing space and frustum may be defined as the structure of Table 4 or 5 below.

TABLE 4

```
struct ViewingFrustrum ( ) {
    signed(32) near_point_x;
    signed(32) near_point_y;
    signed(32) near_point_z;
    signed(32) vector_x;
    signed(32) vector_y;
    signed(32) vector_z;
    signed int(32) centre_tilt;
    unsigned int(32) near_azimuth_range;
    unsigned int(32) near_elevation_range;
    unsigned int(32) far_azimuth_range;
    unsigned int(32) far_elevation_range;
}
```

TABLE 5

```
struct ViewingFrustrum ( ) {
    signed (32) near_point_x;
    signed (32) near_point_y;
    signed (32) near_point_z;
    signed (32) vector_magnitude;
    signed (32) vector_azimuth;
    signed (32) vector_elevation;
    signed int(32) centre_tilt;
    unsigned int (32) near_azimuth_range;
    unsigned int (32) near_elevation_range;
    unsigned int (32) far_azimuth_range;
    unsigned int (32) far_elevation_range};
}
```

Figure 8:
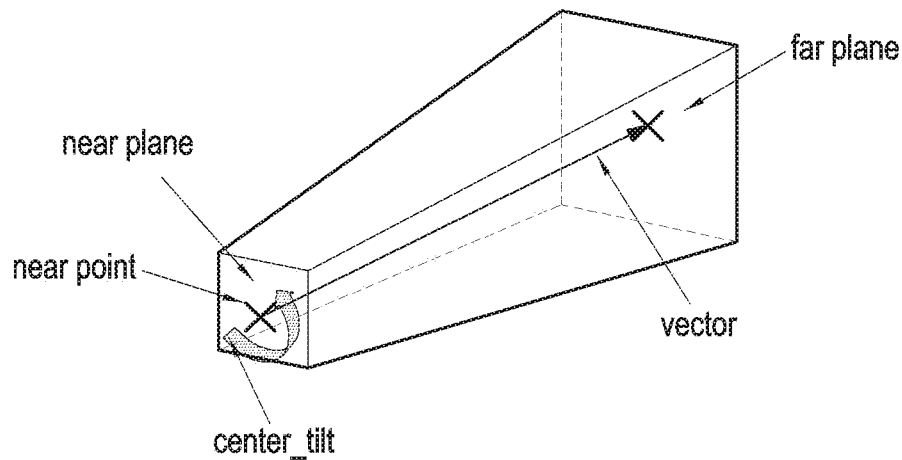
FIG. 8 is a view illustrating a geometrical meaning of each field included in a data structure representing a viewing space according to an embodiment of the disclosure.
Figure 8:
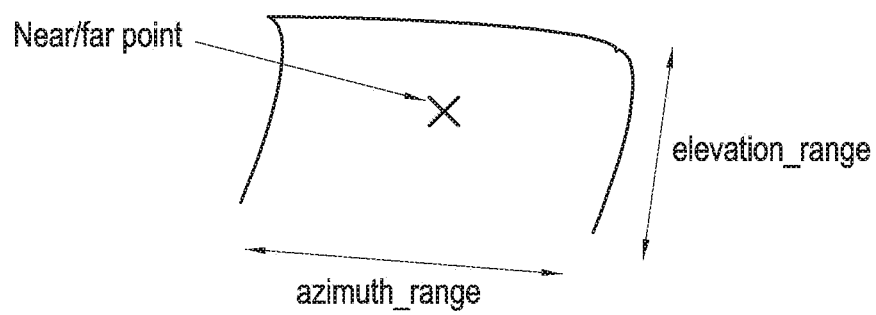

FIG. 8 illustrates the geometric meaning of each field included in the structure of Table 4 according to an embodiment of the disclosure.

The structure of Table 5 is one resulting from representing the vector representing the frustum in the structure of Table 4 separately as a unit vector (vector_azimuth, vector_elevation) indicating size (vector_magnitude) and direction, and this may be regarded as the depth of the frustum and may be used in the course of rendering media which is to be finally displayed on the user display based on comparison between the depths of the two contents.

Figure 9:
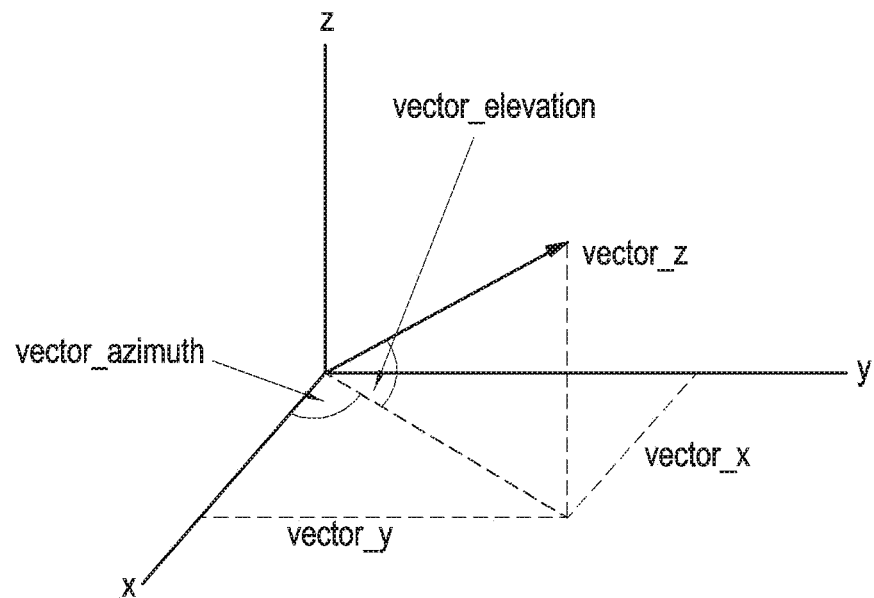
FIG. 9 is a view illustrating a difference in vector representation between data structures representing a viewing space according to an embodiment of the disclosure.

FIG. 9 illustrates differences in vector representation between the structures of Tables 4 and 5 according to an embodiment of the disclosure.

According to an embodiment, the above-described viewing space or frustum may be defined as the structure of Table 6 below.

TABLE 6

```
struct ViewingFrustrum ( ) {
    signed (32) near_point_x;
    signed (32) near_point_y;
    signed (32) near_point_z;
    signed (32) far_point_x;
    signed (32) far_point_y;
    signed (32) far_point_z;
    signed int(32) centre_tilt;
    unsigned int(32) near_azimuth_range;
    unsigned int(32) near_elevation_range;
    unsigned int(32) far_azimuth_range;
    unsigned int(32) far_elevation_range;
}
```

Figure 10:
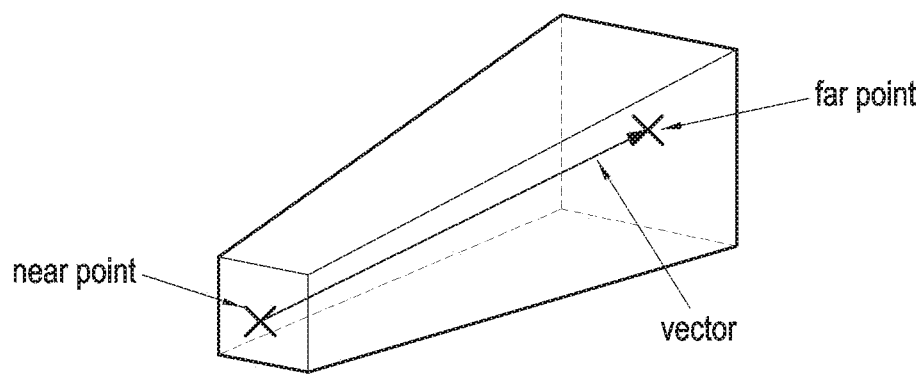
FIG. 10 is a view illustrating a geometrical meaning of each field included in a data structure representing a viewing space.

FIG. 10 illustrates the geometric meaning of each field included in the structure of Table 6 according to an embodiment of the disclosure.

Among the values included in the structure, the center point (near_point_x, near_point_y, near_point_z) of the near plane of the frustum representing the viewing space denotes the position in which the viewer is to view, and the direction (vector_x, vector_y, vector_z) of the frustum denotes the direction and depth in which the viewer is to view. As an example, the viewing direction may be obtained by a direction measuring sensor of the receiver or user input, and the depth may be defined depending on the capability of the viewing terminal or features of the content. As an example, in the case of a 3D display, the maximum depth supported by the display may be given as a physical feature, and the depth of content may be determined upon capturing and creation. Likewise, parameters for defining the size of the far plane of the frustum may also be defined depending on the capability of the viewing terminal or features of content.

According to an embodiment, when an MMT protocol is used in a media service, the viewing space may be transferred from the receiver to the transmitter via a feedback message. The transmitter may grasp the viewing space of the receiver by receiving and processing the feedback message, then select only data corresponding to the viewing space, and transmit the data to the receiver. A process of grasping and selecting a necessary 3D object on a per-MMT asset basis may follow an MMT-based transmission technique.

Table 7 shows an example signaling message formatted in the form of MMT signaling to transfer the structure of Table 4 to the transmitter.

TABLE 7

| Syntax | Values | No. of bits | Mnemonic |
|---|---|---|---|
| Application ( ){ | | | |
|     message_id | | 16 | |
|     version | | 8 | |
|     length | | 16 | |
| application_identifier( ) | | | |
|     if(application_identifier == "urn:mpeg:mmt:app:vpcc:2019") | | | |
|     { | | | |
|     app_message_type | | 8 | |
|         if(app_message_type == 0x03) { | | | |
|         near_point_x | | 32 | |
|         near_point_y | | 32 | |
|         near_point_z | | 32 | |
|         vector_x | | 32 | |
|         vector_y | | 32 | |
|         vector_z | | 32 | |
|         centre_tilt | | 32 | |
|         near_azimuth_range | | 32 | |
|         near_elevation_range | | 32 | |
|         far_azimuth_range | | 32 | |
|         far_elevation_range | | 32 | |
|         } | | | |
|     } | | | |
| } | | | |

For example, the usage of each of the fields in Table 7 above is as follows:

message_id indicates the identifier of the V-PCC application message. (identifier to indicate being a signaling message for V-PCC application);

version indicates the version of the V-PCC application message. (version of the signaling message for V-PCC application);

length indicates the length of the V-PCC application message in bytes, counting from the beginning of the next field to the last byte of the message. The value of this field shall not be equal to 0. (number of bytes from the next field to the last of the corresponding message);

application_identifier—indicates the application identifier as an urn that uniquely identifies the application to consume the contents of this message. (identifier in the form of urn to identify V-PCC application);

app_message_type—defines an application-specific message type. The length of this field is 8 bits. (identifier for identifying the corresponding message (viewing region feedback) of signaling for V-PCC application);

near_point_x—indicates the x coordinate value of the near point of the client's viewing frustum. The near point corresponds to the center point of the near plane of the viewing frustum. (x coordinate of the center point in the near plane of the frustum representing the viewing region);

near_point_y—indicates the y coordinate value of the near point of the client's viewing frustum. The near point corresponds to the center point of the near plane of the viewing frustum. (y coordinate of the center point in the near plane of the frustum representing the viewing region);

near_point_z—indicates the z coordinate value of the near point of the client's viewing frustum. The near point corresponds to the center point of the near plane of the viewing frustum. (z coordinate of the center point in the near plane of the frustum representing the viewing region);

vector_x—indicates the component, in the x coordinate direction, of the vector representing the direction and length of the viewing frustum (from the near plane to the far plane). (x-axis element value of the vector connecting the near plane and far plane of the frustum representing the viewing region);

vector_y—indicates the component, in the y coordinate direction, of the vector representing the direction and length of the viewing frustum. (y-axis element value of the vector connecting the near plane and far plane of the frustum representing the viewing region);

vector_z—indicates the component, in the z coordinate direction, of the vector representing the direction and length of the viewing frustum. (z-axis element value of the vector connecting the near plane and far plane of the frustum representing the viewing region);

center_tilt—specifies the tilt angle of the viewing frustum in units of 2-16 degrees. center_tilt shall be in the range of −180*216 to 180*216−1, inclusive. (value of the tilt of the viewing region represented in the unit of $2^{-16}$);

near_azimuth_range, near_elevation range—specify the azimuth and elevation ranges, respectively, of the near plane region of the viewing frustum in units of 2-16 degrees. near_azimuth_range and near_elevation range specify the range through the near (center) point of the near plane region. near_azimuth_range shall be in the range of 0 to 360*216, inclusive. near_elevation range shall be in the range of 0 to 180*216, inclusive. (value of the azimuth and elevation on the near plane of the frustum representing the viewing region, represented in the unit of $2^{-16}$);

far_azimuth_range, far_elevation range—specify the azimuth and elevation ranges, respectively, of the far plane region of the viewing frustum in units of 2-16 degrees. far_azimuth_range and far_elevation_range specify the range through the far (center) point of the far plane region. far_azimuth_range shall be in the range of 0 to 360*216, inclusive. far_elevation_range shall be in the range of 0 to 180*216, inclusive. (value of the azimuth and elevation on the far plane of the frustum representing the viewing region, represented in the unit of $2^{-16}$).

Upon obtaining information about the viewing region of the receiver via, e.g., MMT signaling, the transmitter may regard the center point of the near plane of the viewing region as the center point of the 360-degree image sphere as shown in FIG. 7, calculate the viewport of the OMAF image, and transfer only data necessary for reproducing the region defined as the viewport to the receiver. In this case, a technique may be used to extract and transmit only data of the region defined as the viewport. For reference, the viewport of the OMAF image is represented as a structure as shown in Table 8, with the center of the 360-degree image sphere regarded as the origin.

TABLE 8

```
aligned(8) SphereRegionStruct(range_included_flag) {
   signed int(32) centre_azimuth;
   signed int(32) centre_elevation;
   signed int(32) centre_tilt;
   if (range_included_flag) {
      unsigned int(32) azimuth_range;
      unsigned int(32) elevation_range;
   }
}
```

According to an embodiment, when the transmitter has obtained the viewing region using the structure specified in Table 4 above, the viewport of the OMAF image may be calculated as follows:

center_azimuth=tan−1(vector_$y$/vector_$x$);

center_elevation=tan−1(vector_$z$/[(vector_$x$)2+(vector_$y$)2]½);

center_tilt=center_tilt;

azimuth_range>=far_azimuth_range;

elevation_range>=far_elevation_range.

According to an embodiment, when the transmitter has obtained the viewing region using the structure specified in Table 5 above, the viewport of the OMAF image may be calculated as follows:

center_azimuth=vector_azimuth;

center_elevation=vector_elevation;

center_tilt=center_tilt;

azimuth_range>=far_azimuth_range;

elevation_range>=far_elevation_range.

The size of the 6DoF sphere and the size of the 360-degree video may be obtained during the course of capturing and content generation. For example, if a soccer game is recorded, the size of the 360-degree video sphere may be set as the whole stadium including the spectators, and the 6DoF sphere may be set as the region of the field in which the game is actually in play. If depth_ratio, a parameter indicating a size ratio of the 6DoF sphere to the 360-degree video sphere is given, the transmitter, according to an embodiment, may calculate the viewport of the OMAF image as follows:

1) Expands the vector of the frustum representing the viewing region to cross the plane of the 360-degree video sphere;

2) Calculates the coordinates of the intersection point (intersection_point), with the center point of the near plane of the frustum regarded as the origin;

3) Calculates the coordinates of the intersection point with respect to the coordinating system of the 360-degree video sphere (intersection_point2);

4) Calculates the distance (distance_magnitude) between the center point of the near plane of the frustum and the intersection point;

5) Calculates the ratio (scaling_factor) of the distance_magnitude to the radius of the 360-degree video sphere;

6) Calculates the size (azimuth_range, elevation_range) of the OMAF viewport based on the scaling_factor; and 7) Identifies the OMAF viewport using the viewport size of step 6) and the intersection_point2.

Meanwhile, the above-described embodiments may be created in a program executable on a computer and may be implemented in a general-purpose digital computer operating the program using a computer-readable recording medium. The computer or the general-purpose computer may be a server or an electronic device for rendering or displaying VR content. The computer or the general-purpose computer may comprise a communication interface for communication with another entity and a controller for controlling operations of the computer or the general-purpose computer. The controller may be configured with at least one processor. Further, the data architecture used in the above-described embodiments may be recorded via a computer-readable media via various means. The above-described embodiments may be implemented in the form of recording media including computer-executable instructions, such as program modules. For example, methods implemented in software modules or algorithms may be stored, as computer readable/executable codes or program instructions, in computer readable recording media.

The computer-readable media may be available media that are accessible by a computer. The computer-readable storage media may include volatile media, non-volatile media, separable media, and/or inseparable media. The computer-readable media may include, but are not limited to, magnetic storage media, e.g., read only memories (ROMs), floppy disks, or hard disks, optical media, e.g., compact disc-ROMs (CD-ROMs), or digital versatile discs (DVDs), or other various storage media. The computer-readable media may include computer storage media and communication media.

A plurality of computer readable recording media may be distributed to computer systems connected over a network, and data, e.g., program instructions and code, stored in the distributed recording media may be executed by at least one computer.

Specific executions described herein are provided merely for example and do not limit the scope of the disclosure in whatever manner. For simplicity purposes, electronic components, control systems, software, and other functional aspects of the systems may be omitted from the description according to the related art.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for transmitting data related to content including an omnidirectional image and a point cloud object, the method comprising:

generating media data and metadata for the content including the omnidirectional image and the point cloud object; and transmitting the generated media data and the generated metadata, wherein the metadata comprises information for specifying sub-spaces of a bounding space which is located within a space corresponding to the omnidirectional image and contains the point cloud object inside the bounding space, and wherein the information for specifying the sub-spaces of the bounding space comprises information specifying whether the bounding space is uniformly divided into the sub-spaces.

2. The method of claim 1, wherein the information for specifying the sub-spaces of the bounding space further comprises:

information specifying a type of the bounding space, wherein if the information specifying the type of the bounding space indicates a cuboid bounding box which is divided into cartesian cuboid blocks, the information for specifying the sub-spaces of the bounding space further comprises:

information specifying dimensions of the cuboid bounding box, and information specifying a number of the cuboid blocks which the cuboid bounding box is divided into for each axis, wherein if the information specifying the type of the bounding space indicates the cuboid bounding box and information specifying whether the bounding space is divided uniformly into the sub-spaces indicates that the bounding space is not uniformly divided into the sub-spaces, the information for specifying the sub-spaces of the bounding space further comprises:

information specifying width, height and depth of each of the cuboid blocks, wherein if the information specifying the type of the bounding space indicates a spherical bounding sphere which is divided into sub-sphere blocks, the information for specifying the sub-spaces of the bounding space further comprises:

information specifying a radius of the spherical bounding sphere, information specifying a number of subdivision sub-sphere columns which the spherical bounding sphere is divided into, information specifying a number of subdivision sub-sphere rows which the spherical bounding sphere is divided into, and information specifying a number of subdivision sub-sphere layers which the spherical bounding sphere is divided into, and wherein if the information specifying the type of the bounding space indicates the spherical bounding sphere and the information specifying whether the bounding space is divided uniformly into the sub-spaces indicates that the bounding space is not uniformly divided into the sub-spaces, the information for specifying the bounding space further comprises:

information indicating column width angle of each of the sub-sphere blocks, information indicating row length angle of each of the sub-sphere blocks, and information indicating depth thickness of each of the sub-sphere blocks.

3. The method of claim 2, wherein the metadata further comprises information for specifying relationship between sub-spaces of the bounding space and regions of a 2-dimensional (2D) frame related to the point cloud object, and wherein the information for specifying the relationship between the sub-spaces of the bounding space and regions of the 2D frame related to the point cloud object comprises:

information specifying a number of the regions of the 2D frame corresponding to each of the sub-spaces, and information specifying granularity of declaration for each of the regions of the 2D frame corresponding to each of the sub-spaces.

4. The method of claim 1, wherein the metadata further comprises information for specifying viewing frustum related to a viewing space, and wherein the information for specifying the viewing frustum comprises:

information specifying a near point of the viewing frustum, wherein the near point indicates a center of a near plane of the viewing frustum, information specifying a vector indicating direction and length of the viewing frustum, or information specifying a far point of the viewing frustum, wherein the far point indicates a center of a far plane of the viewing frustum, information specifying tilt angle of the viewing frustum, information specifying azimuth range and elevation range of the near plane, and information specifying azimuth range and elevation range of the far plane.

5. The method of claim 4, wherein the information for specifying the viewing frustum is transmitted through an MPEG media transport (MMT) signaling message.

6. A method for receiving data related to content including an omnidirectional image and a point cloud object, the method comprising:

receiving media data and metadata for the content including the omnidirectional image and the point cloud object; and rendering the content based on the received media data and the metadata, wherein the metadata comprises information for specifying sub-spaces of a bounding space which is located within a space corresponding to the omnidirectional image and contains the point cloud object inside the bounding space, and wherein the information for specifying the sub-spaces of the bounding space comprises information specifying whether the bounding space is uniformly divided into the sub-spaces.

7. The method of claim 6, wherein the information for specifying the sub-spaces of the bounding space further comprises:

information specifying a type of the bounding space, wherein if the information specifying the type of the bounding space indicates a cuboid bounding box which is divided into cartesian cuboid blocks, the information for specifying the sub-spaces of the bounding space further comprises:

information specifying dimensions of the cuboid bounding box, and information specifying a number of the cuboid blocks which the cuboid bounding box is divided into for each axis, wherein if the information specifying the type of the bounding space indicates the cuboid bounding box and information specifying whether the bounding space is divided uniformly into the sub-spaces indicates that the bounding space is not uniformly divided into the sub-spaces, the information for specifying the sub-spaces of the bounding space further comprises:
information specifying width, height and depth of each of the cuboid blocks,
wherein if the information specifying the type of the bounding space indicates a spherical bounding sphere which is divided into sub-sphere blocks, the information for specifying the sub-spaces of the bounding space further comprises:
information specifying a radius of the spherical bounding sphere,
information specifying a number of subdivision sub-sphere columns which the spherical bounding sphere is divided into,
information specifying a number of subdivision sub-sphere rows which the spherical bounding sphere is divided into, and
information specifying a number of subdivision sub-sphere layers which the spherical bounding sphere is divided into, and
wherein if the information specifying the type of the bounding space indicates the spherical bounding sphere and the information specifying whether the bounding space is divided uniformly into the sub-spaces indicates that the bounding space is not uniformly divided into the sub-spaces, the information for specifying the sub-spaces of the bounding space further comprises:
information indicating column width angle of each of the sub-sphere blocks,
information indicating row length angle of each of the sub-sphere blocks, and
information indicating depth thickness of each of the sub-sphere blocks.

8. The method of claim 7,
wherein the metadata further comprises information for specifying relationship between sub-spaces of the bounding space and regions of a 2-dimensional (2D) frame related to the point cloud object, and
wherein the information for specifying the relationship between the sub-spaces of the bounding space and regions of the 2D frame related to the point cloud object comprises:
information specifying a number of the regions of the 2D frame corresponding to each of the sub-spaces, and
information specifying granularity of declaration for each of the regions of the 2D frame corresponding to each of the sub-spaces.

9. The method of claim 6,
wherein the metadata further comprises information for specifying viewing frustum related to a viewing space, and
wherein the information for specifying the viewing frustum comprises:
information specifying a near point of the viewing frustum, wherein the near point indicates a center of a near plane of the viewing frustum,
information specifying a vector indicating direction and length of the viewing frustum, or information specifying a far point of the viewing frustum, wherein the far point indicates a center of a far plane of the viewing frustum,
information specifying tilt angle of the viewing frustum,
information specifying azimuth range and elevation range of the near plane, and
information specifying azimuth range and elevation range of the far plane.

10. The method of claim 6, wherein the information for specifying a viewing frustum is received through an MPEG media transport (MMT) signaling message.

11. An apparatus for transmitting data related to content including an omnidirectional image and a point cloud object, the apparatus comprising:
a controller; and
a memory storing instructions for operating the controller to:
generate media data and metadata for the content including the omnidirectional image and the point cloud object, and
transmit the generated media data and the generated metadata,
wherein the metadata comprises information for specifying sub-spaces of a bounding space which is located within a space corresponding to the omnidirectional image and contains the point cloud object inside the bounding space, and
wherein the information for specifying the sub-spaces of the bounding space comprises information specifying whether the bounding space is uniformly divided into the sub-spaces.

12. The apparatus of claim 11,
wherein the information for specifying the sub-spaces of the bounding space further comprises:
information specifying a type of the bounding space,
wherein if the information specifying the type of the bounding space indicates a cuboid bounding box which is divided into cartesian cuboid blocks, the information for specifying the sub-spaces of the bounding space further comprises:
information specifying dimensions of the bounding box, and
information specifying a number of the cuboid blocks which the bounding box is divided into for each axis,
wherein if the information specifying the type of the bounding space indicates the cuboid bounding box and information specifying whether the bounding space is divided uniformly into the sub-spaces indicates that the bounding space is not uniformly divided into the sub-spaces, the information for specifying the sub-spaces of the bounding space further comprises:
information specifying width, height and depth of each of the cuboid blocks,
wherein if the information specifying the type of the bounding space indicates a spherical bounding sphere which is divided into sub-sphere blocks, the information for specifying the sub-spaces of the bounding space further comprises:
information specifying a radius of the bounding sphere,
information specifying a number of subdivision sub-sphere columns which the bounding sphere is divided into,
information specifying a number of subdivision sub-sphere rows which the bounding sphere is divided into, and
information specifying a number of subdivision sub-sphere layers which the bounding sphere is divided into, and
wherein if the information specifying the type of the bounding space indicates the spherical bounding sphere and the information specifying whether the bounding space is divided uniformly into the sub-spaces indicates that the bounding space is not uniformly divided into the sub-spaces, the information for specifying the sub-spaces of the bounding space further comprises:

information indicating column width angle of each of the sub-sphere blocks, information indicating row length angle of each of the sub-sphere blocks, and information indicating depth thickness of each of the sub-sphere blocks.

13. The apparatus of claim 12, wherein the metadata further comprises information for specifying relationship between sub-spaces of the bounding space and regions of a 2-dimensional (2D) frame related to the point cloud object, and wherein the information for specifying the relationship between the sub-spaces of the bounding space and regions of the 2D frame related to the point cloud object comprises:

information specifying a number of the regions of the 2D frame corresponding to each of the sub-spaces, and information specifying granularity of declaration for each of the regions of the 2D frame corresponding to each of the sub-spaces.

14. The apparatus of claim 11, wherein the metadata further comprises information for specifying viewing frustum related to a viewing space, and wherein the information for specifying the viewing frustum comprises:

information specifying a near point of the viewing frustum, wherein the near point indicates a center of a near plane of the viewing frustum, information specifying a vector indicating direction and length of the viewing frustum, or information specifying a far point of the viewing frustum, wherein the far point indicates a center of a far plane of the viewing frustum, information specifying tilt angle of the viewing frustum, information specifying azimuth range and elevation range of the near plane, and information specifying azimuth range and elevation range of the far plane.

15. The apparatus of claim 14, wherein the information for specifying the viewing frustum is transmitted through an MPEG media transport (MMT) signaling message.

16. An apparatus for receiving data related to content including an omnidirectional image and a point cloud object, the apparatus comprising:

a controller; and a memory storing instructions for operating the controller to:

receive media data and metadata for the content including the omnidirectional image and the point cloud object; and render the content based on the received media data and the metadata, wherein the metadata comprises information for specifying sub-spaces of a bounding space which is located within a space corresponding to the omnidirectional image and contains the point cloud object inside the bounding space, and wherein the information for specifying the sub-spaces of the bounding space comprises information specifying whether the bounding space is uniformly divided into the sub-spaces.

17. The apparatus of claim 16, wherein the information for specifying the sub-spaces of the bounding space further comprises:

information specifying a type of the bounding space, wherein if the information specifying the type of the bounding space indicates a cuboid bounding box which is divided into cartesian cuboid blocks, the information for specifying the sub-spaces of the bounding space further comprises:

information specifying dimensions of the bounding box, and information specifying a number of the cuboid blocks which the bounding box is divided into for each axis, wherein if the information specifying the type of the bounding space indicates the cuboid bounding box and information specifying whether the bounding space is divided uniformly into the sub-spaces indicates that the bounding space is not uniformly divided into the sub-spaces, the information for specifying the sub-spaces of the bounding space further comprises:

information specifying width, height and depth of each of the cuboid blocks, wherein if the information specifying the type of the bounding space indicates a spherical bounding sphere which is divided into sub-sphere blocks, the information for specifying the sub-spaces of the bounding space further comprises:

information specifying a radius of the bounding sphere, information specifying a number of subdivision sub-sphere columns which the bounding sphere is divided into, information specifying a number of subdivision sub-sphere rows which the bounding sphere is divided into, and information specifying a number of subdivision sub-sphere layers which the bounding sphere is divided into, and wherein if the information specifying the type of the bounding space indicates the spherical bounding sphere and the information specifying whether the bounding space is divided uniformly into the sub-spaces indicates that the bounding space is not uniformly divided into the sub-spaces, the information for specifying the sub-spaces of the bounding space further comprises:

information indicating column width angle of each of the sub-sphere blocks, information indicating row length angle of each of the sub-sphere blocks, and information indicating depth thickness of each of the sub-sphere blocks.

18. The apparatus of claim 17, wherein the metadata further comprises information for specifying relationship between sub-spaces of the bounding space and regions of a 2-dimensional (2D) frame related to the point cloud object, and wherein the information for specifying the relationship between the sub-spaces of the bounding space and regions of the 2D frame related to the point cloud object comprises:

information specifying a number of the regions of the 2D frame corresponding to each of the sub-spaces, and information specifying granularity of declaration for each of the regions of the 2D frame corresponding to each of the sub-spaces.

19. The apparatus of claim 16,
wherein the metadata further comprises information for specifying viewing frustum related to a viewing space, and
wherein the information for specifying the viewing frustum comprises:
   information specifying a near point of the viewing frustum, wherein the near point indicates a center of a near plane of the viewing frustum,
   information specifying a vector indicating direction and length of the viewing frustum, or information specifying a far point of the viewing frustum,
   wherein the far point indicates a center of a far plane of the viewing frustum,
   information specifying tilt angle of the viewing frustum,
   information specifying azimuth range and elevation range of the near plane, and
   information specifying azimuth range and elevation range of the far plane.

20. The apparatus of claim 16, wherein the information for specifying a viewing frustum is received through an MPEG media transport (MMT) signaling message.

* * * * *